United States Patent Office 2,754,947
Patented July 17, 1956

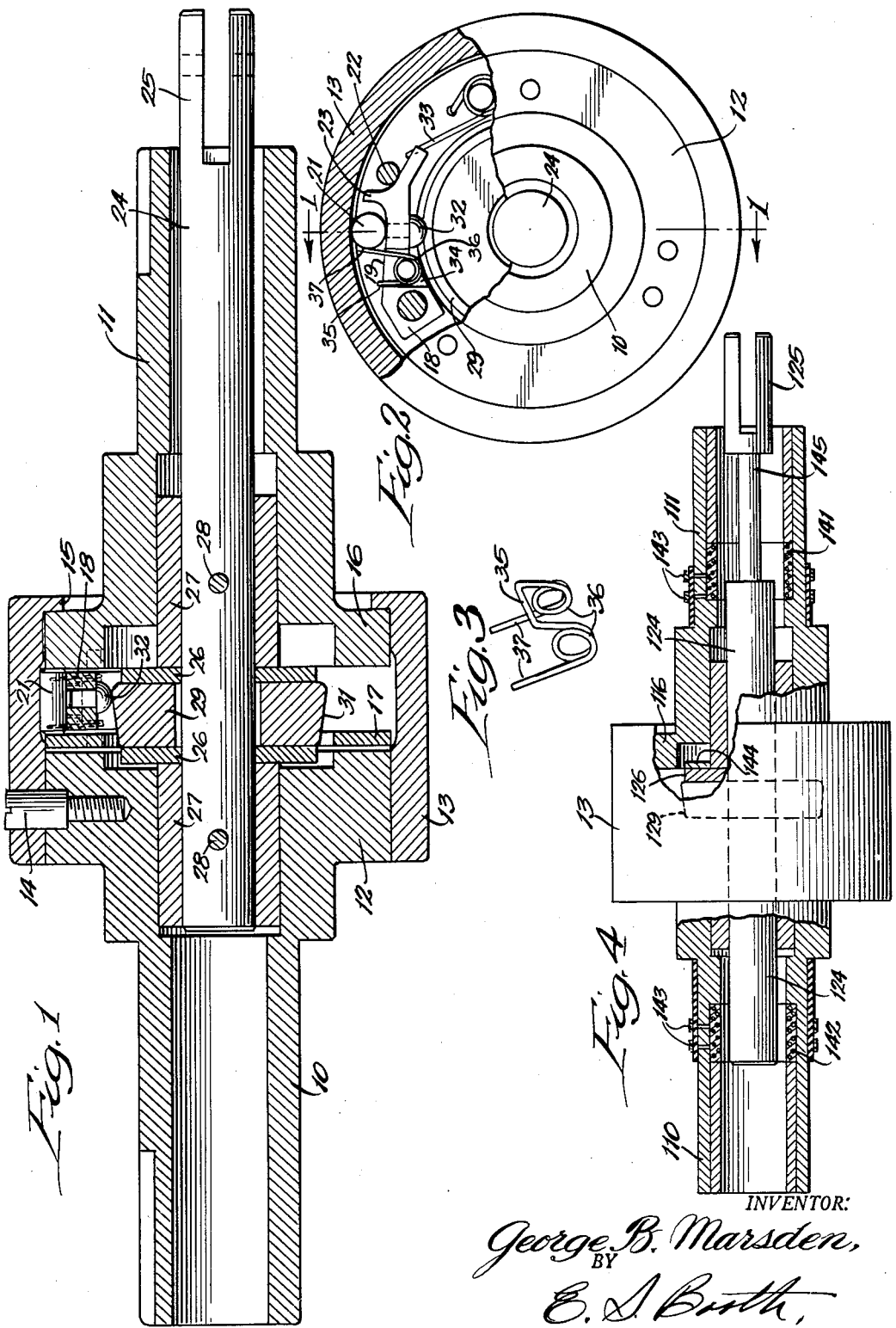

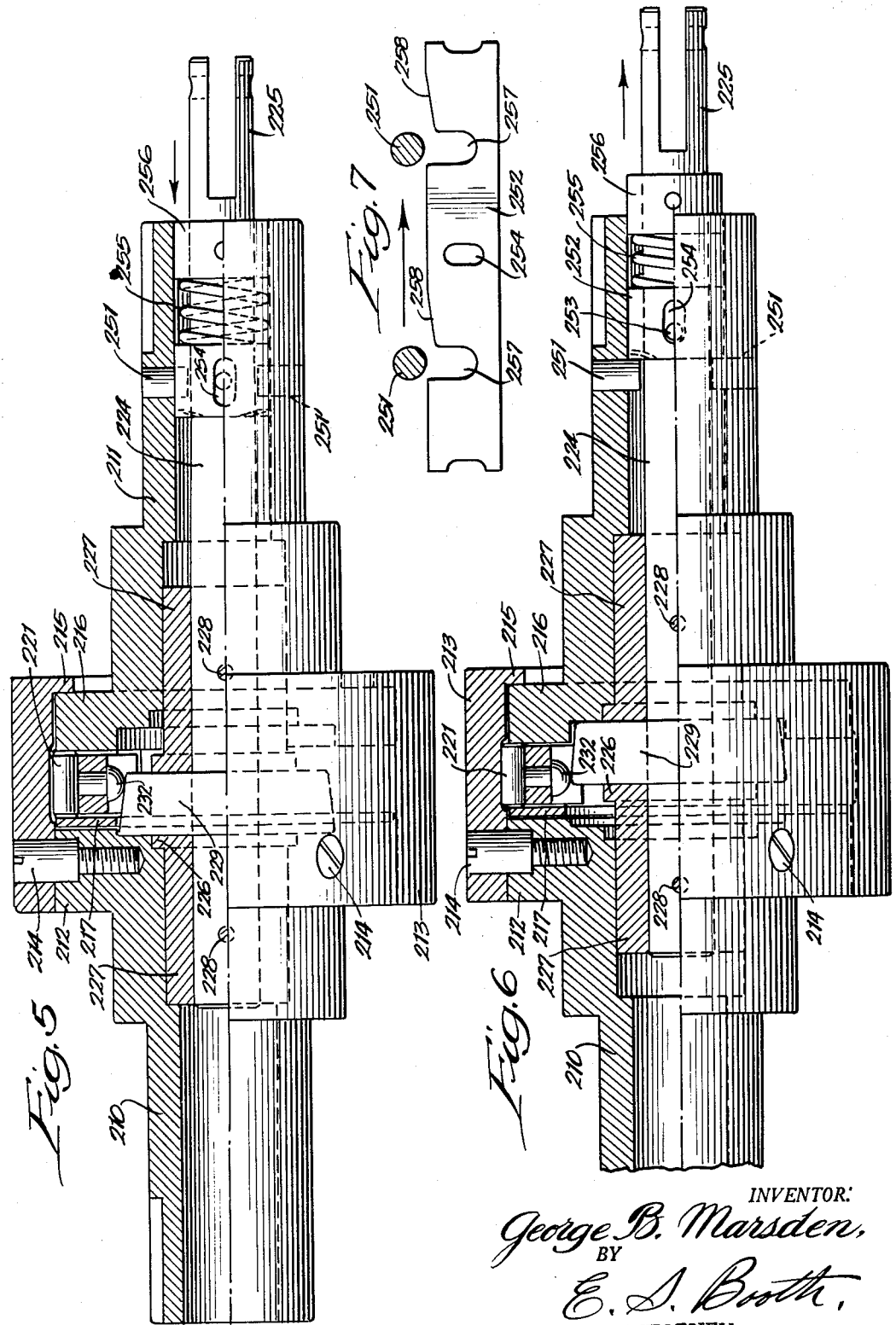

2,754,947

RELEASABLE ONE-WAY CLUTCH

George B. Marsden, Chicago, Ill., assignor to Chicago Nipple Manufacturing Company, Cicero, Ill., a corporation of Delaware Application February 23, 1951, Serial No. 212,356

10 Claims. (Cl. 192—47)

This invention relates to releasable clutches, and more particularly to a clutch which can be engaged and released under load.

One of the objects of the invention is to provide a clutch which is simple and inexpensive to construct and extremely sturdy and reliable in operation.

Another object is to provide a clutch including a plurality of clutch elements in which the load is uniformly distributed among the several elements.

According to one feature of the invention the clutch elements are moved into their engaging position by a shiftable cam ring which can float radially to equalize the pressure on the several clutch elements.

Still another object is to provide a clutch which produces a one-way or overrunning action when the clutch parts are in their engaged position.

A further object is to provide a clutch in which the clutch driven member may be braked when the clutch is released.

A specific object is to provide a resilient stop construction for a cam lever or the like to hold a wedging roller in released position on the lever when the lever is in its clutch-disengaging position.

Still further objects relate to the provision of a clutch which can easily be controlled for single revolution or fractional revolution operation.

The above and other objects and features of the invention will be more readily apparent from the following description when read in connection with the accompanying drawing, in which:

Figure 1 is an axial section on the line 1—1 of Figure 2 showing a clutch embodying the invention;

Figure 2 is an end elevation looking from the left in Figure 1, with parts broken away and in section;

Figure 3 is a perspective view of the resilient stop spring;

Figure 4 is a view similar to Figure 1, showing an alternative construction;

Figures 5 and 6 are sectional views similar to Figure 1 of a single revolution clutch showing the parts in different positions; and Figure 7 is a developed view of the control cam.

The clutch as shown in Figure 1 is adapted to connect a driving member 10 with a driven member 11. As shown, both of the members are tubular to receive a shaft or to have gears or the like mounted thereon. The member 10 terminates in a flange 12 which carries an outer cylindrical ring 13 rigidly secured to the flange by screws 14. At its outer end the ring 13 terminates in an inwardly-turned flange 15 which fits over an enlarged hub or flange portion 16 on the member 11 to hold the parts assembled.

The hub 16 carries in spaced relation thereto a ring 17 to define an annular space in which the clutching mechanism is mounted. As best seen in Figure 2, the clutching mechanism comprises a plurality of cam levers 18 mounted between the hub 16 and the ring 17 to swing toward and away from the inner surface of the sleeve 13. Each of the levers, of which there are preferably at least three, has an outer cam surface 19 to engage balls or rollers 21 so that when the levers are in their engaged position the rollers 21 will be cammed against the inner surface of the sleeve 13 in one relative direction of rotation to connect the members 10 and 11.

As shown in Figure 2, the lever 18 is in its engaged position against a stop pin 22 which determines its maximum outward movement. The levers are also formed with outwardly-extending fingers 23 to limit movement of the rollers 21 toward their disengaged positions so that the rollers will be held properly assembled.

The levers 18 are adapted to be controlled for movement toward and away from the sleeve 13 by a cam mechanism mounted in the member 11. As shown, this mechanism comprises a shift rod 24 extending axially into the member 11 and having a yoke 25 at its outer end through which it may be shifted. The rod 24 carries a pair of spaced annular flanges 26 which may be held in place on the rod by collars 27 secured to the rod by pins 28. An annular cam ring 29 fits loosely between the flanges 26 and has an opening therethrough larger than the shift rod so that it can float radially. The collar 29 terminates in an outer tapered conical surface 31 which engages headed buttons 32 carried by the levers 18. When the shift rod is moved to the left, as shown in Figure 1, the levers will be cammed outward against the stop pins 22 to their clutch-engaging positions. When the shift rod is moved to the right the buttons will register with the small diameter end of the cam surface 31 so that the levers can move inward to disengage the clutch. Coil springs 33 are carried by the flange 16 and engage the ends of the levers to urge them inward.

When the levers are moved inward it is desirable to hold the rollers against movement toward the pivots of the levers 18 to ensure that the clutch cannot accidentally engage. For this purpose each of the levers is formed in its opposite sides adjacent to its pivot end with grooves 34 terminating in relatively sharp shoulders. A resilient stop formed of a strip of spring wire shaped as shown in Figure 3 is mounted on each of the levers to provide a stop. The spring wire has a central U-shaped portion 35 which hooks over the top of the lever and engages one of the shoulders bounding the notches 34. The ends of the U-shaped portion are coiled, as indicated at 36, and may fit over a pin extending through the lever to hold the spring in place. The ends of the coils, as indicated at 37, engage the opposite shoulder bounding the notches 34 and project above the cam surface 19 to engage the rollers 21. Thus, when the levers are in their clutch-disengaging position, the rollers will be held against accidental movement toward the pivoted ends of the levers. During engagement the springs can yield, if required, to permit full wedging action of the rollers.

In operation of the unit the clutch can be engaged at any time under load by shifting the rod 24 to the left. This will cause the levers to move outward, and if the sleeve 13 is tending to turn counterclockwise relative to the member 11, the rollers will wedge and connect the members 10 and 11. In the event the different rollers are in different positions relative to the corresponding levers when engagement occurs, which may happen due to gravitational or other effects, the cam ring 29 can float radially to equalize the pressure on the several levers. Thus the clutch load is uniformly distributed among the several clutching elements. To disengage the clutch it is necessary only to shift the rod 24 to the right, at which time the springs 33 will move the levers inward. With this construction it will be seen that both engagement and disengagement can be effected under full load and that when engaged the mechanism functions in a manner similar to a conventional roller type one-way clutch.

Figure 4 illustrates an alternative construction in which parts corresponding to like parts in Figures 1 to 3 are indicated by the same reference numerals plus 100. In this construction the clutch can be controlled electrically, for which purpose a winding or coil 141 is mounted in the member 111 and a similar coil 142 is mounted in the member 110. The coils may be energized through slip rings 143 to control the clutch as desired. The shift rod 124 is made of such a length that when one end projects fully into one of the coils, the opposite end projects only partially into the other coil. As shown, the coil 142 is energized to shift the rod 124 to the left to engage the clutch. To disengage the clutch the coil 141 is energized to shift the rod to the right.

According to another feature of the invention, as shown in Figure 4, the member 111 is adapted to be braked when the clutch is disengaged. For this purpose the right-hand flange 126 carries a lining 144 of friction material which is adapted to engage the inner surface of the flange or hub 116 when the shift rod is moved to the right. The shift rod is held against rotation through the yoke 125, which is connected to the shift rod through a reduced portion 145 so that the coils can control the rod properly. With this construction, when the friction material 144 engages the flange 116 it will frictionally hold the member 111 against rotation and will quickly bring it to a stop if it is turning when the clutch is disengaged. This feature is desirable for many types of installations.

The construction shown in Figures 5, 6, and 7, is generally similar to that of Figure 1 and parts therein corresponding to like parts in Figure 1 are indicated by the same reference numerals plus 200. This construction is designed to function as a single revolution or fractional revolution clutch to turn through a predetermined portion of a revolution each time the clutch is engaged and then to disengage automatically.

In this construction, the cam ring 229 is preferably reversed from the position shown in Figure 1 so that the clutch is engaged when the control rod 224 is shifted to the right and is disengaged when the ring and control rod are shifted to the left. The control rod is connected through its yoke 225 to an operating lever not shown, which serves to shift the control rod axially and also to hold it against rotation. The pressure of the follower buttons 232 on the cam ring tend to shift it to the left to its disengaged position and if desired a spring may be provided in the control linkage urging the control rod to the left to its disengaged position. When the control rod is shifted to the right, the clutch will be engaged in the same manner as described above in connection with Figure 1, it being noted that this operation can be performed under load.

To hold the switch in its engaged position during the desired portion of a revolution, a cam mechanism is provided having interengaging parts connected to the control rod and to an elongated hub portion on the driven member 211. As shown, the switch is constructed to disengage after one half revolution and for this purpose two cam pins 251 are secured in the hub 211 and extend inwardly toward the control rod 224. A cam collar 252 is slidably mounted on the control rod and is formed with an edge cam surface to engage the pins 251. The collar is held against rotation relative to the control rod and has its axial movement thereon limited by means of pins 253 on the control rod projecting into elongated slots 254 in the collar. A spring 255 acts between the collar and a stop ring 256 secured on the control rod to urge the collar to the left relative to the control rod.

The cam surface on the cam ring 252 is formed as best seen in Figure 7, with two axially extending notches 257 spaced 180° apart. Between the notches, the collar is formed with a gradually sloping cam surface 258 merging into a flat surface. In operation, the pins 251 move relative to the cam surface in the direction of the arrow in Figure 7.

In the clutch disengaged position, as shown in Figure 5, the pins 251 lie in the notches 257 so that the control rod can shift to the left to clutch disengaged position. To engage the clutch, the control rod is momentarily pulled to the right to the position shown in Figure 2 to move the pins out of the notches. At this time, the clutch will engage and the driven member 211 will rotate relative to the control rod which is held stationary. When the member 211 starts to rotate, the pins 251 will ride up the cam surfaces 258 to urge the control rod to the right through the compression spring 255. This spring is preferably employed to produce a yielding clutch engaging force so that the parts will not be damaged and so that extreme accuracy will not be required.

As the driven member 211 continues to turn, the pins will ride over the flat end surface of the cam ring until they come into registry again with the notches 257 after the driven member has turned through one half revolution. At this time, the force acting on the control rod to shift it to the left will produce such a shift to disengage the clutch, the pins moving into the notches 257 during this operation. Thus, each time the clutch is engaged, it will automatically disengage after one half revolution and will then remain disengaged until it is again operated. For a full revolution, one of the pins 251 may be omitted and the cam may be formed with only a single notch while for fractions of a revolution other than one half, the proper number of pins and cam notches can be provided.

While several embodiments of the invention have been shown and described in detail, it will be understood that these are illustrative only and are not to be taken as a definition of the scope of the invention, reference being had for this purpose to the appended claims.

What is claimed is:

1. A releasable clutch comprising coaxial inner and outer clutch members, a plurality of levers symmetrically spaced about the axis of said members and pivoted on the inner member on axes parallel to the common axis of the clutch members for swinging toward and away from the outer member, rollers fitting between the levers and the outer member to wedge therebetween when the levers are swung toward the outer member, springs urging the levers away from the outer member, a cam ring carried by the inner member and having a tapered outer surface to cam the levers outward, and means mounting the cam ring for axial shifting movement and for free floating radial movement.

2. A releasable clutch comprising coaxial inner and outer clutch members, a plurality of levers symmetrically spaced about the axis of said members and pivoted on the inner member on axes parallel to the common axis of the clutch members for swinging toward and away from the outer member, rollers fitting between the levers and the outer member to wedge therebetween when the levers are swung toward the outer member, springs urging the levers away from the outer member, a cam ring carried by the inner member and having a tapered outer surface to cam the levers outward, a shift rod slidable axially in the inner member, and means connecting the cam ring to the shift rod for axial movement therewith and for free radial floating relative thereto.

3. A releasable clutch comprising coxial inner and outer clutch members, a plurality of levers symmetrically spaced about the axis of said members and pivoted on the inner member on axes parallel to the common axis of the clutch member for swinging toward and away from the outer member, rollers fitting between the levers and the outer member to wedge therebetween when the levers are swung toward the outer member, stops on the inner member to limit outward swinging of the levers, springs urging the levers inward, resilient stops on the levers to hold the rollers out of wedging position when the levers are swung inward, a cam ring carried by the inner member and having a tapered outer surface engaging the levers, and means to shift the cam ring axially to cam the levers outward.

4. A releasable clutch comprising coaxial inner and outer clutch members, a plurality of levers symmetrically spaced about the axis of said members and pivoted on the inner member on axes parallel to the common axis of the clutch members for swinging toward and away from the outer member, rollers fitting between the levers and the outer member to wedge therebetween when the levers are swung toward the outer member, stops on the inner member to limit outward swinging of the levers, springs urging the levers inward, resilient stops on the levers to hold the rollers out of wedging position when the levers are swung inward, a cam ring carried by the inner member and having a tapered outer surface engaging the levers, a shift rod slidable axially in the inner member, and means connecting the cam ring to the shift rod for axial movement therewith and for radial movement relative thereto.

5. A releasable clutch comprising coaxial inner and outer clutch members, levers pivoted on the inner member for swinging toward and away from the outer member, rollers fitting between the levers and the outer member to wedge therebetween when the levers are swung toward the outer member, stops on the inner member to limit outward swinging of the levers, springs urging the levers inward, resilient stops on the levers to hold the rollers out of wedging position when the levers are swung inward, a cam ring carried by the inner member and having a tapered outer surface engaging the levers, a shift rod slidable axially in the inner member, spaced flanges on the shift rod between which the cam ring fits for radial floating movement, and a friction lining on one of the flanges engageable with one of the members when the rod is shifted in a direction to permit inward movement of the levers.

6. In a releasable clutch, a lever having inner and outer faces and formed on one face with a wedge surface, a roller engaging the wedge surface, one side of the lever being formed with a groove intersecting said one face, and a coil spring lying in the groove with one end projecting therefrom beyond said one face of the lever to form a resilient stop for the roller.

7. A releasable clutch comprising coaxial rotatable clutch members, a tubular hub on one of the members, clutch elements movably carried by one of the members for movement into clutching engagement with the other member, a control rod extending into the hub for axial sliding relative to the hub, means to hold the control rod against rotation, control means moved by the rod upon axial sliding thereof to move the clutch elements, and interengaging cam parts on the hub and the control rod to move the control rod axially upon rotation of the hub relative to the control rod.

8. A releasable clutch comprising coaxial rotatable clutch members, a tubular hub on one of the members, clutch elements movably carried by one of the members for movement into clutching engagement with the other member, a control rod extending into the hub for axial sliding relative to the hub, control means moved by the control rod upon axial sliding thereof to move the clutch elements, means to hold the control rod against rotation, a cam collar slidable on the control rod, a cam part fixed to the hub and engaging the cam collar to urge the collar in the direction the control rod moves to engage the clutch, and a spring connecting the cam collar to the control rod resiliently to urge the control rod in a direction to engage the clutch.

9. A releasable clutch comprising coaxial rotatable inner and outer clutch members, clutch elements carried by the inner member for radial movement toward and away from the outer member, a cam ring slidably mounted in the inner member and having a tapered outer surface engageable with the clutch members to move them radially outward to clutch engaging position when the ring is shifted axially in one direction, a tubular hub on the inner member, a control rod extending through the hub and connected to the ring to shift it, means to hold the control rod against rotation, and interengaging cam parts on the control rod and the hub to control the axial position of the control rod in response to rotation of the hub.

10. A releasable clutch comprising coaxial rotatable inner and outer clutch members, clutch elements carried by the inner member for radial movement toward and away from the outer member, a cam ring slidably mounted in the inner member and having a tapered outer surface engageable with the clutch members to move them radially outward to clutch engaging position when the ring is shifted axially in one direction, a tubular hub on the inner member, a control rod extending through the hub and connected to the ring to shift it, means to hold the control rod against rotation, a cam collar on the control rod having an axially extending notch therein, and a pin on the hub, the pin entering the notch to permit sliding of the control rod in a direction to disengage the clutch and engaging the edge of the collar to hold the control rod in a position to engage the clutch.

References Cited in the file of this patent

UNITED STATES PATENTS

| | | |
|---|---|---|
| 846,178 | Avery | Mar. 5, 1907 |
| 1,153,831 | Slentz | Sept. 14, 1915 |
| 1,569,420 | Clisson | Jan. 12, 1926 |
| 1,692,130 | Long et al. | Nov. 20, 1928 |
| 1,990,015 | Allen | Feb. 5, 1935 |
| 2,322,608 | Webster | June 22, 1943 |
| 2,398,849 | Novy | Apr. 23, 1946 |
| 2,539,065 | Erwood | Jan. 23, 1951 |

FOREIGN PATENTS

| | | |
|---|---|---|
| 23,146 | Great Britain | Nov. 15, 1901 |